(12) United States Patent
Zhu et al.

(10) Patent No.: US 11,308,212 B1
(45) Date of Patent: Apr. 19, 2022

(54) ADJUDICATING FILES BY CLASSIFYING DIRECTORIES BASED ON COLLECTED TELEMETRY DATA

(71) Applicant: CA, INC., San Jose, CA (US)

(72) Inventors: Qian Zhu, Valley Village, CA (US); Alexander Lichstein, Santa Monica, CA (US); Daniel Sosa, Los Angeles, CA (US)

(73) Assignee: CA, INC., New York, NY (US)

( * ) Notice: Subject to any disclaimer, the term of this patent is extended or adjusted under 35 U.S.C. 154(b) by 363 days.

(21) Appl. No.: 16/453,766

(22) Filed: Jun. 26, 2019

(51) Int. Cl.
| | |
|---|---|
| *G06F 21/00* | (2013.01) |
| *G06F 21/56* | (2013.01) |
| *G06F 16/185* | (2019.01) |

(52) U.S. Cl.
CPC .......... *G06F 21/566* (2013.01); *G06F 16/185* (2019.01); *G06F 2221/034* (2013.01)

(58) Field of Classification Search
CPC .... G06F 21/566; G06F 21/554; G06F 21/562; G06F 21/565; G06F 21/577; G06F 21/561; G06F 16/185; H04L 63/1433; H04L 63/1416
See application file for complete search history.

(56) References Cited

U.S. PATENT DOCUMENTS

| | | | |
|---|---|---|---|
| 8,087,080 B1 * | 12/2011 | Wan | G06F 21/51 726/22 |
| 2016/0366167 A1 * | 12/2016 | Yumer | H04L 63/1425 |

\* cited by examiner

*Primary Examiner* — Tri M Tran
(74) *Attorney, Agent, or Firm* — Foley & Lardner LLP (57) ABSTRACT

Telemetry data from client file reputation queries is collected over time. Directories/sub-directories under which files of queries are located are identified. The files including the reputations for the files under a given directory/sub-directory are identified and used to calculate the reputation score for the directory/sub-directory. The directory/sub-directory is then classified based on the calculated score for the directory/sub-directory. After the classification of directories/sub-directories, reputation for a file with unknown reputation is then determined based on the classification of the directory/sub-directory under which the file is located.

20 Claims, 7 Drawing Sheets

ADJUDICATING FILES BY CLASSIFYING DIRECTORIES BASED ON COLLECTED TELEMETRY DATA

TECHNICAL FIELD

This disclosure pertains generally to computer security, and more specifically to adjudicating files as benign or malicious based on classifying the directories under which the files are located.

BACKGROUND

Backend or cloud-based file reputation service applications deliver reputation scores of files to clients in response to queries for this information. File reputation service traffic may range from 10k-200k requests per second. Conventionally, the file reputation score is in the form of a range. When clients receive accurate and meaningful reputation data, the clients are able to discern whether the files are "good" or "bad" (benign or malicious). By default, files with unknown reputations are conventionally assigned a low or another form of placeholder value which might be inaccurate and/or useless. Accelerating the trajectory of files away from unknown reputation status to a higher-confidence band is a key problem facing in the current file reputation service technologies.

It would be desirable to address this issue.

SUMMARY

A directory/sub-directory-based file reputation determination is provided. Specifically, the reputation for a file with unknown reputation is determined based on the reputation of a directory/sub-directory under which the file is located.

To determine the reputation of a directory/sub-directory, telemetry data from client file reputation queries is collected over time. Directories/sub-directories under which files of queries are located are identified. The files including the reputation for the files under a given directory and each sub-directory thereof are identified and used to calculate the reputation score for the directory/sub-directories. The directory/sub-directory is then classified based on the calculated score for the directory/sub-directory. If the calculated reputation score is greater than a first threshold, the directory/sub-directory is considered as known benign. If the calculated reputation score is less than a second threshold, the directory/sub-directory is considered as known malicious. After the classification of the directory/sub-directory, the file is then classified based on the classification of the directory/sub-directory under which the file is located.

In certain circumstances, files used for calculation of the reputation of a directory/sub-directory may include only certain files in the directory/sub-directory, e.g., files with a Ground Truth, High Good, or High Bad reputation. By including only files with known reputation with high-confidence, the calculated reputation may more accurately reflect the actual reputation of the directory/sub-directory.

In certain circumstances, besides the reputation of the files under the directory/sub-directory, other factors may also be considered in determining the reputation of the directory/sub-directory. These factors may include machine count for the number of machines that submit a query for the files under the directory/sub-directory, the popularity of the directory/sub-directory, a time span without GT/HI (Ground truth/High) bad files under the directory/sub-directory, etc. By including additional factors in calculating the reputation of a directory/sub-directory, the accuracy in determining the reputation of the directory/sub-directory is further improved, which then further improves the reliability for the directory/sub-directory-based file reputation determination.

The Figures depict various implementations for purposes of illustration only. One skilled in the art will readily recognize from the following discussion that alternative implementations of the structures and methods illustrated herein may be employed without departing from the principles described herein.

DETAILED DESCRIPTION

Figure 1:
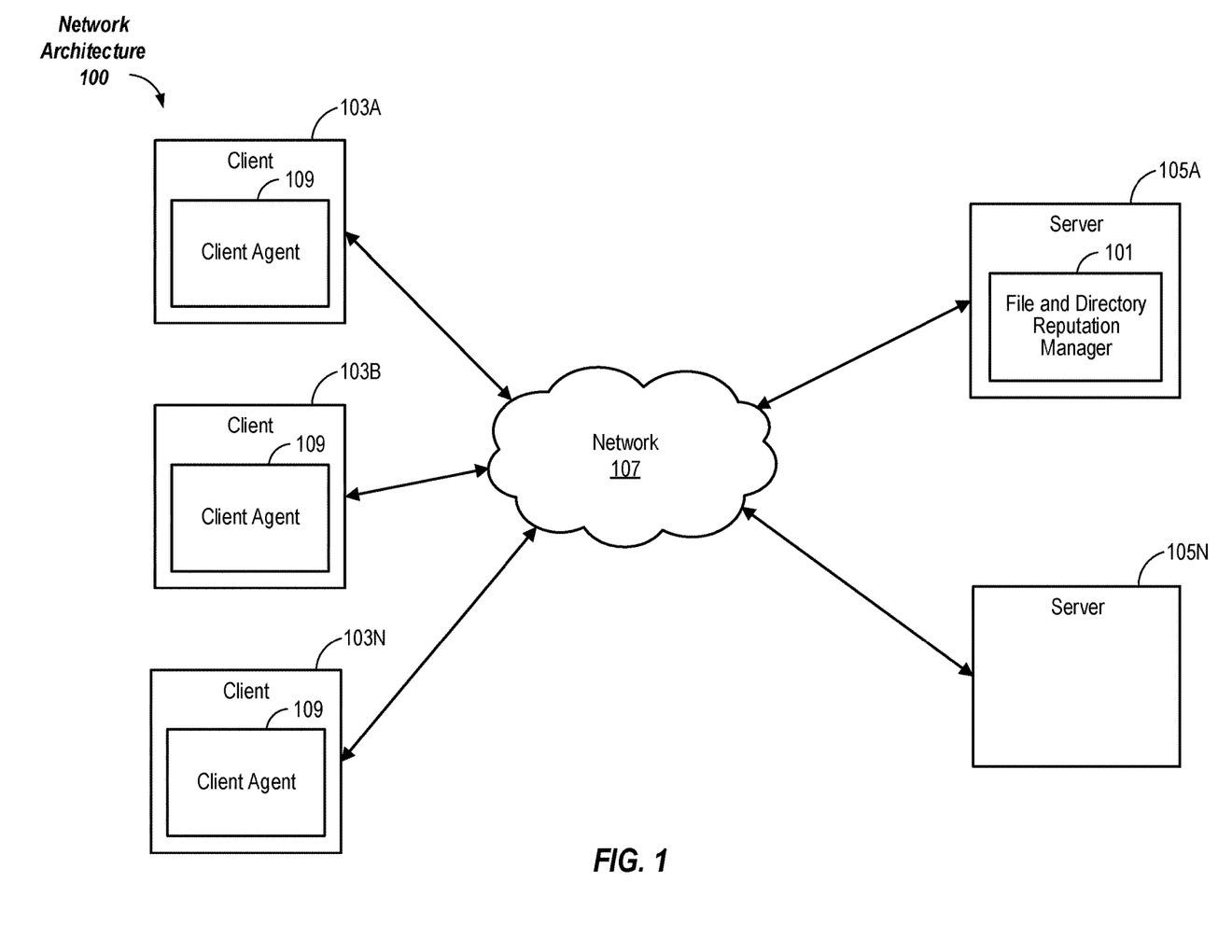
FIG. 1 is a block diagram of an exemplary network architecture in which a file and directory reputation manager can be implemented, according to some implementations.

FIG. 1 is a high-level block diagram illustrating an exemplary network architecture 100 in which a file and directory reputation manager 101 can be implemented. The illustrated network architecture 100 comprises multiple clients 103A, 103B, and 103N (together may be referred to as "client(s) 103") as well as multiple servers 105A and 105N (together may be referred to as "server(s) 105"). In FIG. 1, the file and directory reputation manager 101 is illustrated as residing on the server 105A, with a client agent 109 running on each client 103A-C. It is to be understood that this is an example only. In various implementations, various functionalities of a file and directory reputation manager 101 can be instantiated on a client 103, a server 105, or can be distributed among multiple clients and/or servers 105.

Clients 103 and servers 105 can be implemented using computer systems 210 such as the one illustrated in FIG. 2 and described below. The clients 103 and servers 105 are communicatively coupled to a network 107, for example via a network interface 248 as described below in conjunction with FIG. 2. Clients 103 are able to access applications and/or data on servers 105 using, for example, a web browser or other client software (not shown). Clients 103 can be in the form of mobile computing devices, comprising portable computer systems capable of connecting to a network 107 and running applications (e.g., smartphones, tablet computers, wearable computing devices, etc.). Clients may also be in the form of laptops, desktops and/or other types of computers/computing devices. Servers 105 can be in the form of, e.g., rack-mounted computing devices, located, e.g., in data centers.

Although FIG. 1 illustrates three clients 103 and two servers 105 as an example, in practice many more (or fewer) clients 103 and/or servers 105 can be deployed. In one implementation, the network 107 is in the form of the Internet. Other networks 107 or network-based environments can be used in other implementations.

Figure 2:
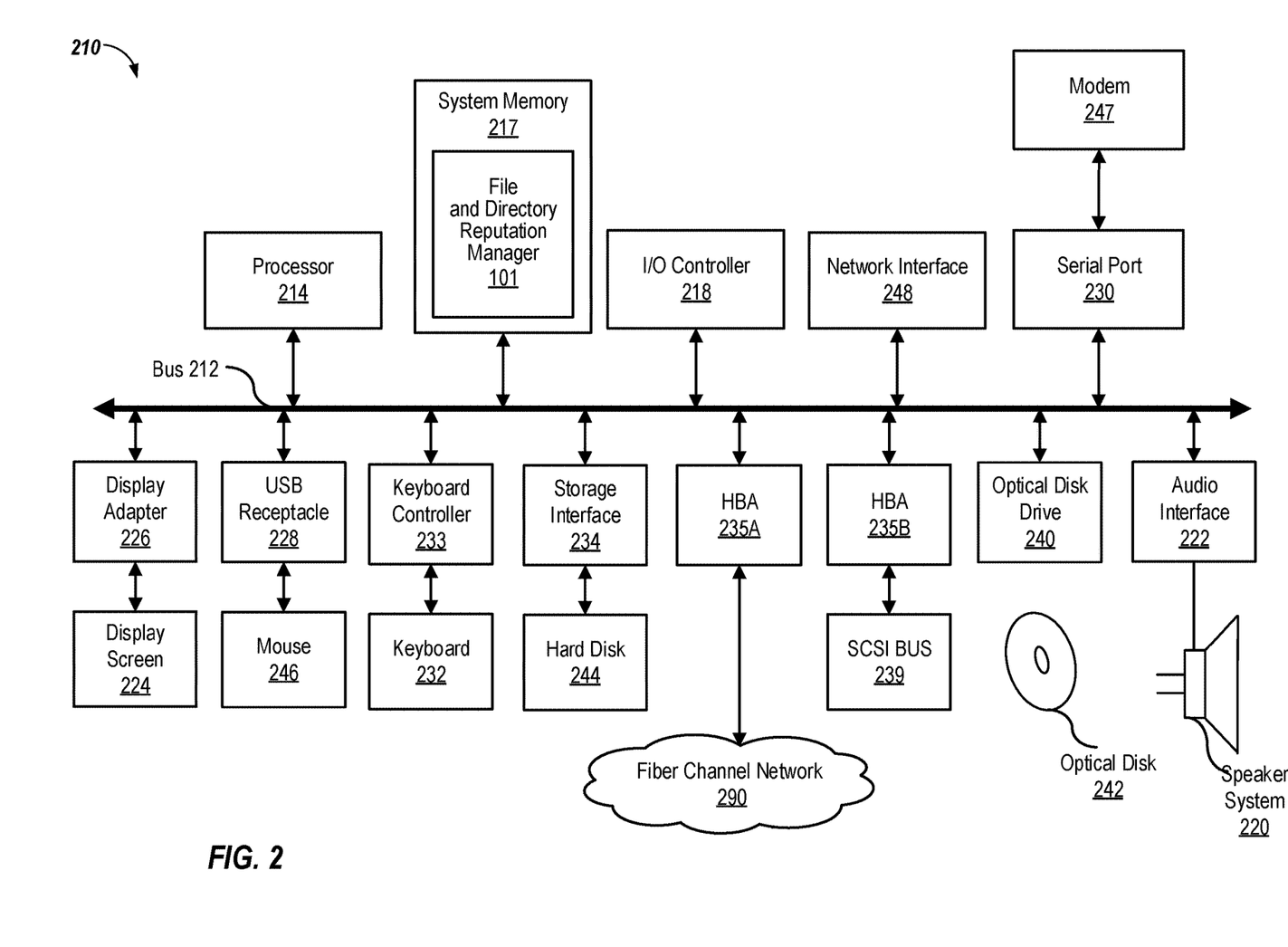
FIG. 2 is a block diagram of an exemplary computer system suitable for implementing directory-based file reputation identification, according to some implementations.

FIG. 2 is a block diagram of a computer system 210 suitable for implementing a file and directory reputation manager 101. Both clients 103 and servers 105 can be implemented in the form of such computer systems 210. As illustrated, one component of the computing device 210 is a bus 212. The bus 212 communicatively couples other components of the computing device 210, such as at least one processor 214, system memory 217 (e.g., random access memory (RAM), read-only memory (ROM), flash memory), an input/output (I/O) controller 218, an audio output interface 222 communicatively coupled to an external audio device such as a speaker 220, a display adapter 226 communicatively coupled to an external video output device such as a display screen 224, one or more interfaces such as Universal Serial Bus (USB) ports 228, serial ports 230, etc., a keyboard controller 233 communicatively coupled to a keyboard 232, a storage interface 234 communicatively coupled to at least one hard disk 244 (or other form(s) of data storage media such as solid state drives (SSDs)), a host bus adapter (HBA) interface card 235A configured to connect with a Fibre Channel (FC) network 290, an HBA interface card 235B configured to connect to a SCSI bus 239, an optical disk drive 240 configured to receive an optical disk 242, a mouse 246 (or other pointing devices) coupled to the bus 212 e.g., via a USB port 228, a modem 247 coupled to bus 212, e.g., via a serial port 230, and one or more wired and/or wireless network interface(s) 248 coupled, e.g., directly to bus 212.

Other components (not illustrated) may be connected in a similar manner (e.g., document scanners, digital cameras, printers, etc.). Conversely, all of the components illustrated in FIG. 2 need not be present (e.g., smartphones and tablets typically do not have optical disk drives 240, external keyboards 242 or external pointing devices 246, although various external components can be coupled to mobile computing devices via, e.g., USB ports 228). The various components can be interconnected in different ways from that shown in FIG. 2.

The bus 212 allows data communication between the processor 214 and system memory 217, which, as noted above may include ROM and/or flash memory as well as RAM. The RAM is typically the main memory into which the operating system and application programs are loaded. The ROM and/or flash memory can contain, among other code, the Basic Input-Output system (BIOS) which controls certain basic hardware operations. Application programs can be stored on a local computer readable medium (e.g., hard disk 244, optical disk 242) and loaded into system memory 217 and executed by the processor 214. Application programs can also be loaded into system memory 217 from a remote location (i.e., a remotely located computing device 210), for example via the network interface 248 or modem 247. In FIG. 2, the file and directory reputation manager 101 is illustrated as residing in system memory 217. The workings of the file and directory reputation manager 101 are explained in greater detail below in conjunction with FIGS. 3-7.

The storage interface 234 is coupled to one or more hard disks 244 (and/or other standard storage media such as SSDs). The hard disk(s) 244 may be a part of computing device 210, or may be physically separate and accessed through other interface systems.

The network interface 248 and or modem 247 can be directly or indirectly communicatively coupled to a network 107 such as the internet. Such coupling can be wired or wireless.

Figure 3:
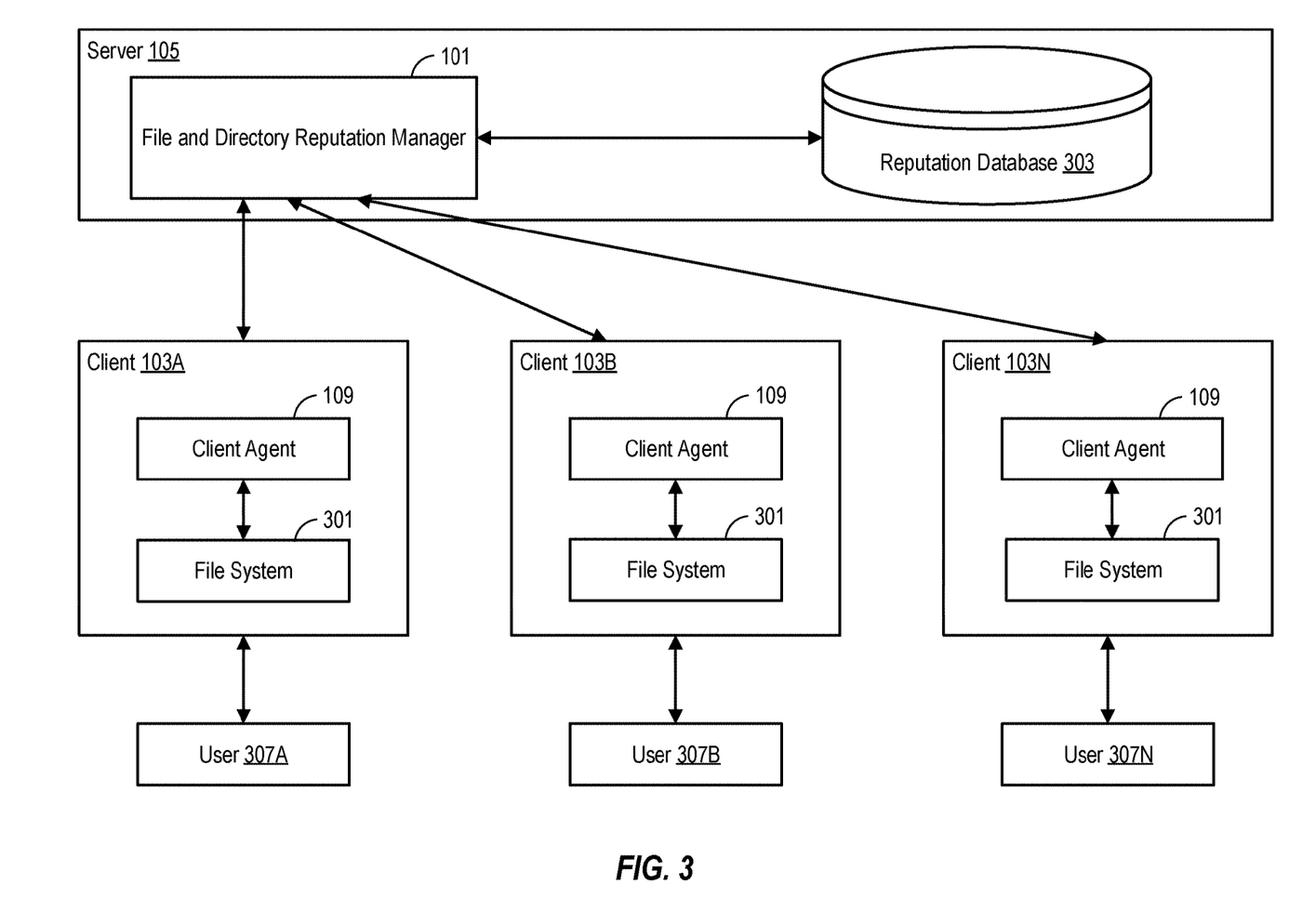
FIG. 3 is a block diagram of the operation of a file and directory reputation manager, according to some implementations.
Figure 4:
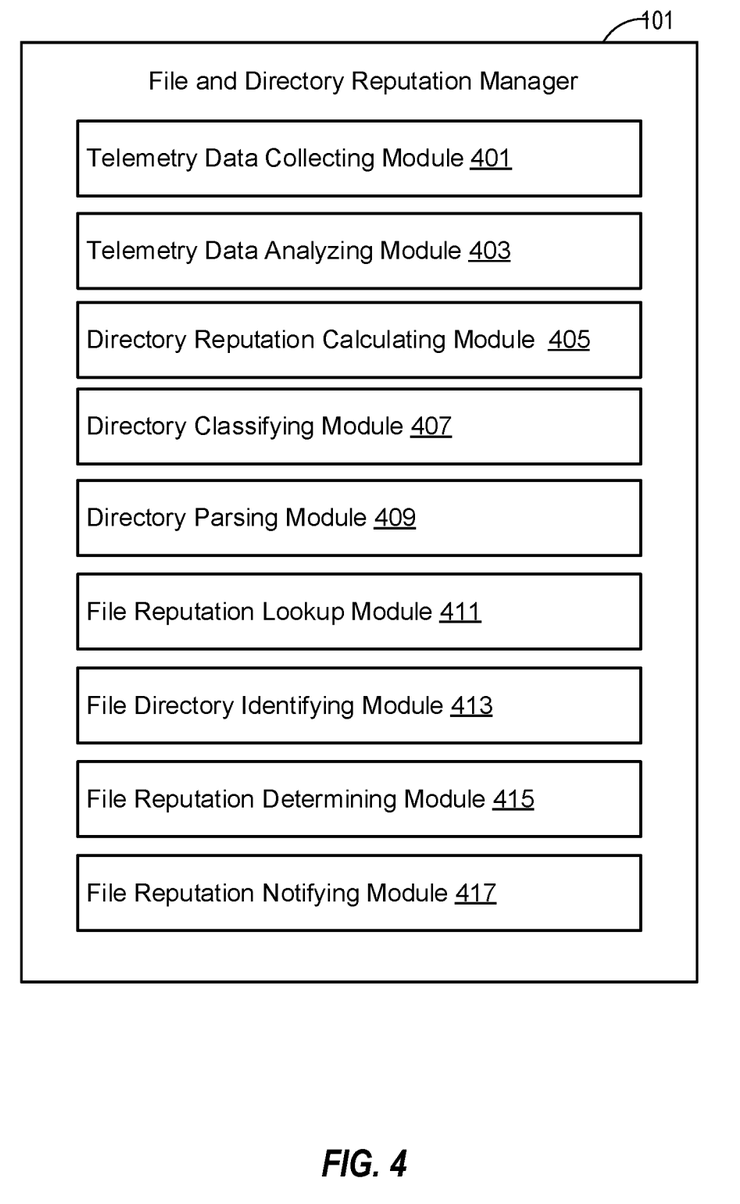
FIG. 4 is a block diagram of specific modules of a server-side file and directory reputation manager, according to some implementations.

FIGS. 2 and 3 illustrate a file and directory reputation manager 101 running in the system memory 217 of a server 105. As described above, the functionalities of the file and directory reputation manager 101 can reside on a server 105, a client 103, or be distributed among multiple computer systems 210, including within a cloud-based computing environment in which the functionalities of the file and directory reputation manager 101 are provided as a service over a network 107. It is to be understood that although the file and directory reputation manager 101 is illustrated in FIGS. 2 and 3 as a single entity, the illustrated file and directory reputation manager 101 represents a collection of functionalities, which can be instantiated as a single or multiple modules on one or more computing devices 210 as desired. FIG. 4 illustrates a specific implementation in which the file and directory reputation manager 101 is instantiated in the form of specific, multiple modules. In other implementations, the functionalities of the file and directory reputation manager 101 are distributed and/or instantiated in other ways. It is to be understood that in some implementations, the file and directory reputation manager 101 may be instantiated as part of or otherwise in conjunction with a file reputation service application (not separately illustrated) that services file reputation queries from client applications.

It is to be understood that the modules of the file and directory reputation manager 101 can be instantiated (for example as object code or executable images) within the system memory 217 (e.g., RAM, ROM, flash memory) of any computer system 210, such that when the processor 214 of the computer system 210 processes a module, the computer system 210 executes the associated functionality. As used herein, the terms "computer system," "computer," "client," "client computer," "server," "server computer" and "computing device" mean one or more computers configured and/or programmed to execute the described functionality. Additionally, program code to implement the functionalities of the file and directory reputation manager 101 can be stored on computer-readable storage media. Any form of tangible computer readable storage medium can be used in this context, such as magnetic or optical storage media. As used herein, the term "computer-readable storage medium" does not mean an electrical signal separate from an underlying physical medium.

FIG. 3 is a block diagram of the operation of the file and directory reputation manager 101, according to an implementation in which the file and directory reputation manager 101 is located on a server 105. As shown in the figure, the file and directory reputation manager 101 receives a large number of queries for the reputation of one or more files from various clients 103 via the client agents 109 running thereon. The file and directory reputation manager 101 determines the reputation of a specific file by first querying a reputation database 303 (which may be cloud-based and/or distributed, although it is illustrated in the figure as being located on the server 105). If the reputation of the file is known and stored in the reputation database 303, the file reputation may be directly returned to the client 103 (through the client agent 109). If the reputation of the file is unknown, the file and directory reputation manager 101 may determine the reputation of the file by determining a directory (or sub-directory) under which the file is located.

Specifically, to determine the reputation of a directory (or sub-directory) under which the file is located, telemetry data including a large number of customer file reputation queries may be collected from a file reputation service application. From the telemetry data, file directories, the files under each directory, the reputations for the files under each directory, and the machine count (i.e., the number of computing devices that have submitted the queries for the files under the directory) for each directory may be identified. The reputation of a directory is then calculated by using an algorithm that takes into consideration the identified reputations of the files under the directory and machine count associated with the directory. The calculated reputation score for the directory may then be used to classify the directory. For instance, a directory with a calculated reputation score greater than a first threshold may be classified as a "good" directory or a directory that is known benign, while a directory with a calculated reputation score less than a second threshold may be classified as a "bad" directory or a directory that is known malicious. A file with an otherwise unknown reputation may be then determined to be "good" or "bad" correspondingly based on the classification of the directory under which the file is located. More details about directory (or sub-directory)-based file reputation determination are provided in conjunction with the descriptions in FIGS. 4-7.

FIG. 4 illustrates modules of a file and directory reputation manager 101 according to one implementation. As illustrated in FIG. 4, the file and directory reputation manager 101 includes a telemetry data collecting module 401, a telemetry data analyzing module 403, a directory reputation calculating module 405, a directory classifying module 407, a directory parsing module 409, a file reputation lookup module 411, a file directory identifying module 413, a file reputation determining module 415, and a file reputation notifying module 417.

The telemetry data collecting module 401 collects customer reputation query data (may also be referred to as "telemetry data") from a file reputation service application. In general, a file reputation service application may receive 10k-200k file reputation queries per second. For a specific file reputation query, a directory under which the file is located may be included in the query. In some implementations, a file reputation query may also include information about the machine that submits the query, such as a MAC address, IP address, etc. In response to the query, the file reputation service application may return a reputation score for the specific query. In some implementations, files may be classified by the service reputation provider based on the reputation score of a file. For instance, the files may be classified as "Ground Truth (GT)," "High Good (HI Good)," "High Bad (HI Bad)," "Low Good," "Low Bad", "Unknown," etc., where each classification indicates a confidence of how good/bad a file reputation is. For instance, a file of GT/HI good or GT/HI bad may indicate a good or bad reputation of a file with high confidence. In some implementations, the telemetry data collecting module 401 may only collect the telemetry data for files with high confidence, e.g., GT/HI good or GT/HI bad files. In some implementations, the telemetry data for all files are collected from the file reputation service application.

In some implementations, the telemetry data collected by the telemetry data collecting module 401 includes both information about the queries (including directories and machines having submitted queries) from the customers and the reputation scores returned to the customers by the file reputation service application.

The telemetry data analyzing module 403 analyzes the telemetry data collected from the file reputation service application. For instance, the telemetry data analyzing module 403 may parse the collected telemetry data, to identify a specific directory, the files under the directory, and corresponding reputation scores for the files under the directory, as well as the machine count associated with the directory (i.e., how many machines have queried the files under the directory).

The directory reputation calculating module 405 calculates the reputation score for each directory identified from the telemetry data. The directory reputation calculating module 405 may calculate the reputation score of a directory based on the reputation of files located within the directory. For instance, a directory includes N number of files under the directory. The reputation of the N number of files (or less if some files do not have a reputation score) may be used to calculate the reputation of the directory. In some implementations, to increase the accuracy in calculating the directory reputation, only files with a high confidence reputation score (including GT/HI good or GT/HI bad files) are selected for the calculation of the reputation score of the directory.

Different algorithms may be configured to calculate the reputation of a directory based on the reputation of the selected files. For example, one algorithm for calculating a directory reputation may be as follows:

$$\text{highscore} = \log_2\left(\frac{\sum_{i=1}^{n}(highg)^2 + 1}{\sum_{i=1}^{n}(highb)^2 + 1}\right)$$

where "highg" represents the reputation of a GT/HI good file, "highb" represents the reputation of a GT/HI bad file. The square of a reputation is to scale up the effect of the GT/HI files. Numerator+1 is to prevent an undefined logarithm result, denominator+1 is to prevent dividing by 0, and base 2 logarithm is to normalize the result.

To walk through one example, suppose there are six distinct files with already known reputation scores of −114, −105, −8, 112, 56, and 20 under a file directory, where the specific values of the reputation scores have been calculated and provided by the file reputation service application using an algorithm previously configured or defined by the reputation service provider. Among the six distinct files, there are four files with GT/HI reputation scores, including two GT/HI bad files with a respective reputation score of −114 and −105 and two GT/HI good files with a respective reputation score of 112 and 56, which are used for the calculation:

$$\text{highscore} = \log_2\left(\frac{(112)^2 + (56)^2 + 1}{(-114)^2 + (-105)^2 + 1}\right)$$

In some implementations, the directory reputation calculating module 405 may consider other factors in calculating the reputation score for a directory, to improve the accuracy of the calculation. For instance, the machine count associated with a directory may be also taken into consideration in calculating the reputation score of a directory. Accordingly, the above algorithm may be further modified to include the machine count, as shown in the following:

$$\frac{\prod_{i=1}^{m}\frac{\sum_{i=1}^{n}(g)^2}{n}}{\sum_{i=1}^{n}\left(\frac{\sum_{i=1}^{n}(b)^2}{n}\right)m}$$

where m is the number of machines (e.g., clients 103) that have submitted a query for the files under the directory (i.e., the machine count associated with the directory). It should be noted that the machine count for a directory is determined based on the machines (i.e., client 103) that have submitted a query for the files under the directory, but not the number of machines that contain such directory. In real applications, actual machines that contain a directory may be more than the machine count included in the above calculation, since some machines may not necessarily submit a file reputation query for a file under the directory.

The directory classifying module 407 classifies a directory based on the calculated reputation score for the directory. The directory may be classified as a "good" directory if the calculated reputation score for the directory is greater than a first threshold, or classified as a "bad" directory if the calculated reputation score is less than a second threshold. The specific values to use for these thresholds are variable design parameters.

In some implementations, besides the calculated reputation score, the directory classifying module 407 may also consider other factors in classifying a directory. These other factors may include, but are not limited to, the popularity of a directory, a time span without GT/HI bad files under a directory, etc. For instance, if a directory has a high number of associated queries (e.g., daily query >100k), the directory may be considered to have a good reputation. For another example, if a directory does not have GT/HI bad files for 2-3 months, the directory may be also considered to be a "good" directory. It should be noted that the above-discussed various factors for directory classification may be applied independently or in different combinations and/or weightings in classifying a directory.

In some implementations, the directory classifying module 407 may whitelist or blacklist a directory after the classification of a directory. For instance, a directory with a good reputation may be whitelisted, while a directory with a bad reputation may be blacklisted. In some implementations, if a directory is not identified as a "good" or "bad" directory based on the above-discussed approaches, the directory may be listed in a "gray" list. In some implementations, the whitelist, blacklist, and gray-list for the directories may be stored in the reputation database 303.

In some implementations, there are a large number of files and/or a diversity of reputations of files under a directory. Accordingly, the file and directory reputation manager 101 may also include a directory parsing module 409 that parses a directory into a series of sub-directories.

The file directory parsing module 409 may parse a directory into a series of sub-directories at different desired levels of granularity in a parent-child hierarchy. For instance, take the example of a directory under which a file is located: csidl_windows\winsxs\manifests. This directory may be parsed into three different levels of sub-directories: csidl_windows, csidl_windows\winsxs, and csidl_windows\winsxs\manifests, where csidl_windows is a higher level of sub-directory than the other two sub-directories and is the parent directory of csidl_windows\winsxs. Similarly, csidl_windows\winsxs is the parent directory of csidl_windows\winsxs\manifests.

It should be noted that the above is merely one example for parsing a directory. In actual applications, there are different ways to parse a directory. That is, a directory may be parsed into different sub-directories at different levels of granularity. The specific way of parsing a directory may vary and depend on the number of files in each sub-directory, the percentage of GT/HI files in each sub-directory, how many levels of sub-directories are in a directory, how many sub-directories to be parsed for a directory, etc.

After a directory is parsed into a plurality of sub-directories, a reputation score may be calculated for each parsed sub-directory. Accordingly, the directory reputation calculating module 405 may further calculate the reputation scores for the sub-directories. The calculation of the reputation scores for the sub-directories may be similar to those described above for the calculation of reputation scores of the directories.

Similarly, the directory classifying module 407 may further classify a sub-directory based on the calculated reputation score for the sub-directory. The classified sub-directories may also be whitelisted/blacklisted as described above.

In some implementations, if a parent directory/sub-directory and a child sub-directory are both whitelisted, the directory classifying module 407 may remove the child sub-directory from the whitelist. Similarly, if a parent directory/sub-directory and a child sub-directory are both blacklisted, the child sub-directory may be removed from the blacklist. For instance, if both csidl_windows\winsxs, and csidl_windows\winsxs\manifests are whitelisted, csidl_windows\winsxs\manifests may be removed from the whitelist.

Figure 6:
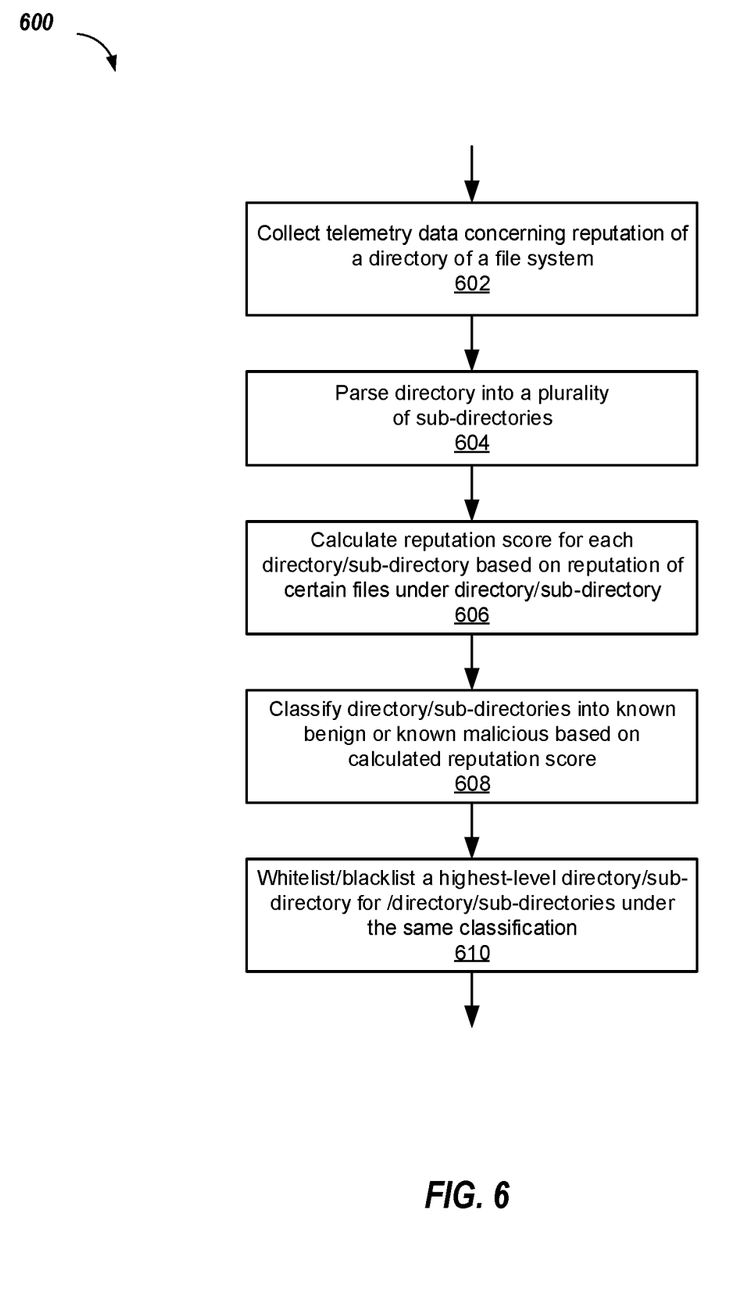
FIG. 6 is a flowchart of an exemplary method for classifying a directory/sub-directory of a file system, according to some implementations.
Figure 7:
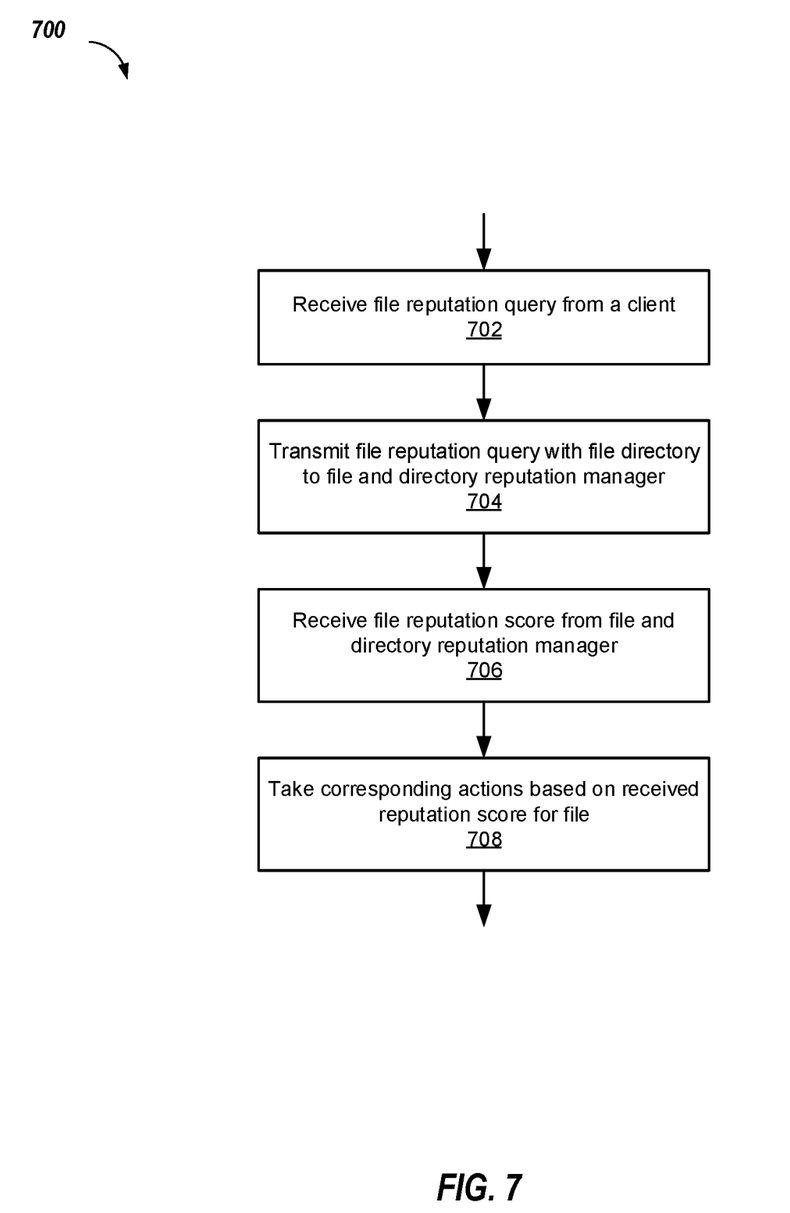
FIG. 7 is a flowchart of an exemplary method for implementing directory-based file reputation identification, according to some implementations.

In some implementations, the classification of a directory/sub-directory (i.e., a blacklisted or whitelisted directory/sub-directory) may be used to determine the reputation of a file with unknown reputation when a file reputation query for such file is received, as described in details with reference to FIGS. 6-7.

The file reputation lookup module 411 checks a file reputation from the coupled file reputation database 303. In some implementations, the file and directory reputation manager 101 may receive a lot of queries for file reputations of specific files. Upon receiving a query, the file reputation lookup module 411 may first check a file reputation database 303 to see whether there is already an established reputation for a file in the query. If the file reputation is already established and stored in the reputation database, the file reputation may be directly delivered to the client 103.

In some implementations, a file may not have a known reputation in the file reputation database 303. In this scenario, the file and directory reputation manager 101 may determine the file reputation through the directory/sub-directory of the file system 301 under which the file is located, as will be described in detail below in conjunction with FIG. 6.

The file directory identifying module 413 may identify a directory under which a file is located in response to a file reputation query from a client 103. For instance, the file directory identifying module 413 may identify a directory for a file with unknown reputation. In some implementations, a file reputation query may include a full pathname for a specific file. Accordingly, the file directory may be directly identified from the full path name for the specific file. Based on the identified directory, the file directory identifying module 413 may further query the reputation database 303 to check whether the directory (or a specific sub-directory) is whitelisted or blacklisted. The file reputation score for a file with unknown reputation may be then determined based on the whitelisted or blacklisted directory.

The file reputation determining module 415 may determine the reputation score for a file based on a directory/sub-directory under which the file is located. In some implementations, the file reputation determining module 415 may automatically assign a default value to a file with unknown reputation when the file is found to be under a directory/sub-directory that is whitelisted or blacklisted. For instance, if a file with unknown reputation is found to be located under a directory/sub-directory that is whitelisted, a corresponding reputation score or a classification (e.g., Hi good) may be automatically assigned to the file with unknown reputation, and the assigned reputation score for the file with unknown reputation may be automatically stored in the reputation database 303 for later query. Similarly, if a file with unknown reputation is found to be located under a directory/sub-directory that is blacklisted, a corresponding reputation score or classification (e.g., Hi bad or whatever) may be assigned to the file with unknown reputation.

In some implementations, if a file with unknown reputation is under a parent directory/sub-directory and a child sub-directory that are classified into different categories (e.g., a parent directory/sub-directory is blacklisted, while a child sub-directory is whitelisted), the file is automatically assigned a reputation score based on the classification of the child sub-directory, but not the parent directory/sub-directory.

In this way, files with unknown reputations may be automatically assigned a reputation based on the classification of the directory/sub-directory under which the file is located. The reputation score assigned in this way may more accurately reflect the actual reputation of a file with unknown reputation, thereby providing more useful, meaningful information to a user, compared to just a placeholder value as provided by a conventional file reputation system.

The file reputation notifying module 417 notifies a client 103 of the reputation for a file with the determined reputation, in response to a file reputation query. The file reputation notifying module 407 may communicate with the client agent 109 to deliver the reputation score of a file to the client 103.

Figure 5:
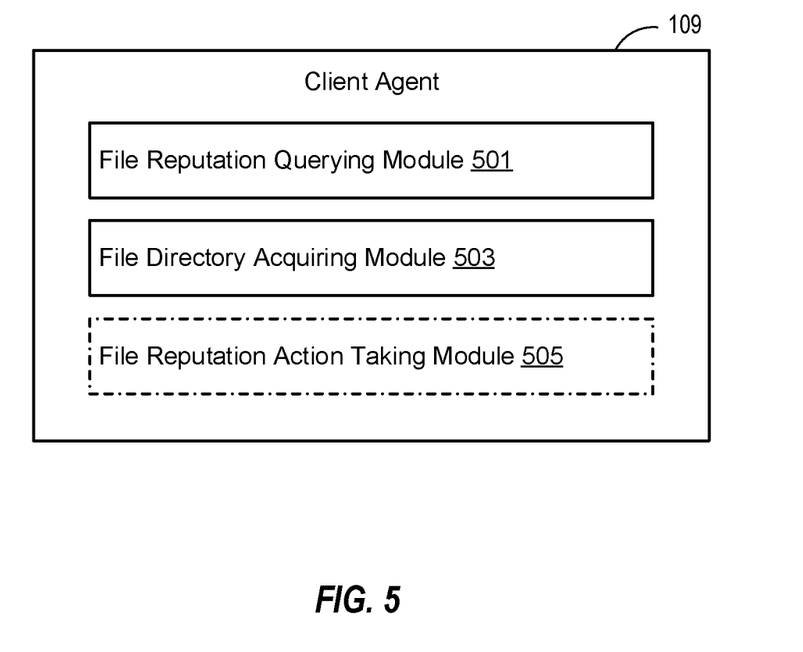
FIG. 5 is a block diagram of specific modules of a client agent that works in conjunction with a server-side file and directory reputation manager, according to some implementations.

FIG. 5 illustrates the specific modules of a client agent 109 that works in conjunction with a server-side file and directory reputation manager 101. As illustrated in the figure, a client agent 109 may include a file reputation querying module 501, a file directory acquiring module 503, and a file reputation action taking module 505.

The file reputation querying module 501 may generate a file reputation query for one or more files in a client system 103. The query may be generated in response to a user request or may be generated automatically based on a time scheduled by a user 307 associated with a client 103. In some implementations, a query may be automatically generated in a client when certain criteria are met. For instance, when a file with unknown reputation is found, or when a file has not been queried for reputation for a given period of time, etc. After the generation, a query may be delivered to the file and directory reputation manager 101 located on a server 105 (or on a client system 103 in some implementations).

The file directory acquiring module 503 may acquire the file directory of a file from a file system 301. In some implementations, the server-side file and directory reputation manager 101 may not know the directory for a file when a file reputation query is received (e.g., if the query is made without a pathname). Accordingly, the file and directory reputation manager 101 may communicate with the client agent 109 of the client 103 to request the directory for the file. The file directory acquiring module 503 may then acquire the file directory for the file from the associated file system 301. In some implementations, a file directory may be acquired in advance by the file directory acquiring module 503 in a client agent 109, which is then sent together with the file reputation query to the file and directory reputation manager 101 for determining the reputation for a queried file.

The file reputation action taking module 505 may take certain actions according to the reputation received for a file. After the reputation score for a queried file is determined by the file and directory reputation manager 101, the reputation score may be returned to the client agent 109. In some implementations, if the received reputation indicates that a file has a good reputation (i.e., the file is considered as "benign" or is "known benign"), the file reputation action taking module 505 of client agent may directly send the file reputation to the client without any further action.

In some implementations, if the received file reputation indicates that a file is malicious (i.e., the file has a bad reputation or is considered as "known malicious"), the file reputation action taking module 505 may automatically generate an alert to indicate that the file is malicious. In some implementations, the file reputation action taking module 505 may automatically block a file from access by a user or even delete a file if the file is identified to be malicious. In some implementations, the file reputation action taking module 505 may further communicate with one or more security applications to further scan a file that is identified to be malicious. Other possible actions that help improve the security of a file system 301 and a client 103 may also be considered.

In some implementations, a client agent 109 may include more or fewer components than those illustrated in FIG. 5. For instance, a client agent 109 may include an additional anti-malware scanning tool to scan files in a file system 301. For another instance, part or all of the functionality of a file and directory reputation manager 101 may reside in a client agent 109. In yet another example, a client agent 109 may not necessarily contain a file reputation action taking module 505.

For more information concerning the implementations of the file and directory reputation manager 101 and client agent 109 may refer to the following method implementations described in FIGS. 6 and 7.

FIG. 6 is a flowchart of an exemplary method for classifying a directory/sub-directory of a file system.

At step 602, the file and directory reputation manager 101 collects telemetry data concerning the reputation of a directory of a file system. The telemetry data may be collected from file reputation query data of a file reputation service and stored in the reputation database 303. The telemetry data may include file directories, the files under a directory, and the reputation for the files under a directory. In some implementations, the telemetry may also include machine count that counts the machines that have submitted a reputation query for files under a directory.

At step 604, the file and directory reputation manager 101 parses a directory into a plurality of sub-directories. The directory may be parsed in a parent-child hierarchy, and may be parsed at different levels of granularity, as previously described.

At step 606, the file and directory reputation manager 101 calculates the reputation score for one or more directories/sub-directories based on the reputation of certain files under the directory/sub-directory. In some implementations, only GT/HI good files and GT/HI bad files are used for the calculation, while other files are not taken into account in the calculation.

At step 608, the file and directory reputation manager 101 classifies directories/sub-directories into known benign and known malicious based on the calculated reputation scores for these directories/sub-directories. A directory/sub-directory with a score greater than a first threshold may be considered as known benign, while a directory/sub-directory with a score less than a second threshold may be considered as known malicious.

At step 610, the file and directory reputation manager 101 whitelists/blacklists a highest-level of directory/sub-directory among directory/sub-directories of a directory that are identified as being benign or being malicious. For instance, if a directory/parent sub-directory and child sub-directory are classified into the same classification (i.e., known benign, or known malicious), only the directory/parent sub-directory is whitelisted or blacklisted, as previously described.

By blacklisting or whitelisting a directory/sub-directory, the files with unknown reputation under the directory/sub-directory may be also classified correspondingly, and thus a reputation score may be automatically assigned to a file with unknown reputation based on a default value set for each classification. In this way, the reputation score for a file with unknown reputation may be determined.

FIG. 7 is a flowchart of an exemplary method for implementing directory-based file reputation identification on a client 103. The method may be implemented by a client agent 109 in conjunction with the file and directory reputation manager 101 on a server 105 in some implementations.

At step 702, the client agent 109 receives a file reputation query from a client 103. The query may include a query for the reputation of one or more files in a file system 301.

At step 704, the client agent 109 identifies the directories for the one or more files in the query. The identified directories may be delivered to the file and directory reputation manager 101 for determining the reputation of a file within unknown reputation based on the directory/sub-directory under which the file is located. The reputation of a directory/sub-directory may be determined to be known benign or known malicious as previously described. Based on the reputation of the directory/sub-directory, a reputation score may be determined for a file with unknown reputation. In some implementations, the file and directory reputation manager 101 may also acquire the reputation score of a file from the reputation database if the file has a known reputation. The determined reputation score is then returned to the client agent 109 of the client 103 that has submitted the query.

At step 706, the client agent 109 receives the file reputation score for a file from the file and directory reputation manager 101.

At step 708, the client agent 109 may provide the received reputation score to the client 103. In some implementations, the client agent 109 may additionally/alternatively provide a classified reputation for a file to the client, such as High Good, High Bad, etc. In some implementations, if the reputation score received from the file and directory reputation manager 101 indicates that a file has a bad reputation, the client agent 109 may further generate an alert for the client. In some implementations, the client agent 109 may communicate with a security application to scan a file with a determined bad reputation, to further confirm the file reputation determined based on the reputation of the directory/sub-directory. If the file is confirmed to be malicious, the client agent 109 may take additional actions, thereby improving the security of the client.

As will be understood by those familiar with the art, the invention may be embodied in other specific forms without departing from the spirit or essential characteristics thereof. Likewise, the particular naming and division of the portions, modules, agents, managers, components, functions, procedures, actions, layers, features, attributes, methodologies, data structures and other aspects are not mandatory or significant, and the mechanisms that implement the invention or its features may have different names, divisions and/or formats. The foregoing description, for purpose of explanation, has been described with reference to specific implementations. However, the illustrative discussions above are not intended to be exhaustive or limited to the precise forms disclosed. Many modifications and variations are possible in view of the above teachings. The examples were chosen and described in order to best explain relevant principles and their practical applications, to thereby enable others skilled in the art to best utilize various implementations with or without various modifications as may be suited to the particular use contemplated.

What is claimed is:

1. A computer-implemented method for classifying directories of a file system, the method comprising:
analyzing telemetry data concerning a directory of the file system and files under the directory of the file system;
computing a reputation score for the directory of the file system based on a reputation of one or more of the files under the directory of the file system, wherein computing the reputation score for the directory includes computing a reputation score for each of a plurality of sub-directories of the directory; and
classifying the directory of the file system into one of known benign and known malicious based on the computed reputation score for the directory of the file system.

2. The method of claim 1, further comprising:
collecting the telemetry data concerning the directory of the file system and the files under the directory from a file reputation database.

3. The method of claim 1, wherein computing the reputation score for the directory based on the reputation of one or more of the files under the directory further comprises:
computing the reputation score for the directory based on reputation of files with ground truth, high good, and high bad reputation.

4. The method of claim 1, wherein computing the reputation score for the directory further comprises:
computing the reputation score for the directory based on the number of computing devices that initiate a reputation query for the directory.

5. The method of claim 1, wherein computing the reputation score for the directory further comprises:
parsing a full path of the directory into the plurality of sub-directories.

6. The method of claim 5, wherein parsing the full path of the directory into the plurality of sub-directories further comprising:

parsing the full path of the directory in a parent-child hierarchy with a given number of levels.

7. The method of claim 6, wherein classifying the directory into one of known benign and known malicious further comprising:

whitelisting a sub-directory at a highest level of the directory of the file system, the whitelisted sub-directory having a reputation score greater than a first threshold.

8. The method of claim 6, wherein classifying the directory into one of known benign and known malicious further comprising:

blacklisting a sub-directory of a highest level of the directory of the file system, the blacklisted sub-directory having a reputation score less than a second threshold.

9. The method of claim 1, further comprising:

receiving a query from a client for a reputation of a file with unknown reputation;

identifying a directory under which the file with unknown reputation is located; and classifying the file with unknown reputation based on a classification of the directory under which the file with unknown reputation is located.

10. The method of claim 9, wherein classifying the file with unknown reputation based on the classification of the directory under which the file with unknown reputation is located further comprises:

classifying the file with unknown reputation based on a classification of a sub-directory under which the file with unknown reputation is located.

11. The method of claim 9, further comprising:

responsive to the file with unknown reputation being classified as malicious, generating an alert for the client indicating that the file with unknown reputation is malicious.

12. The method of claim 9, further comprising:

responsive to the file with unknown reputation being classified as benign, automatically delivering a message to the client indicating that the file with unknown reputation is benign.

13. At least one non-transitory computer-readable storage medium for directory-based file reputation determination, the at least one non-transitory computer-readable storage medium storing computer executable instructions that, when loaded into computer memory and executed by at least one processor of a computing device, cause the computing device to perform the following steps:

analyzing telemetry data concerning a directory of a file system and files under the directory of the file system;

computing a reputation score for the directory of the file system based on a reputation of one or more of the files under the directory of the file system, wherein computing the reputation score for the directory includes computing a reputation score for each of a plurality of sub-directories of the directory; and classifying the directory of the file system into one of known benign and known malicious based on the computed reputation score for the directory of the file system.

14. The at least one non-transitory computer-readable storage medium of claim 13 further storing computer-executable instructions to perform the following additional step:

collecting the telemetry data concerning the directory of the file system and the files under the directory from a file reputation database.

15. The at least one non-transitory computer-readable storage medium of claim 13 further storing computer-executable instructions to perform the following additional step:

computing the reputation score for the directory based on reputation of files with ground truth, high good, and high bad reputation.

16. The at least one non-transitory computer-readable storage medium of claim 13 further storing computer-executable instructions to perform the following additional step:

computing the reputation score for the directory based on the number of computing devices that initiate a reputation query for the directory.

17. The at least one non-transitory computer-readable storage medium of claim 13 further storing computer-executable instructions to perform the following additional step:

parsing a full path of the directory into the plurality of sub-directories.

18. The at least one non-transitory computer-readable storage medium of claim 17 further storing computer-executable instructions to perform the following additional step:

parsing the full path of the directory in a parent-child hierarchy with a given number of levels.

19. The at least one non-transitory computer-readable storage medium of claim 18 further storing computer-executable instructions to perform the following additional step:

whitelisting a sub-directory at a highest level of the directory of the file system, the whitelisted sub-directory having a reputation score greater than a first threshold.

20. A computer system for directory/sub-directory based file reputation determination, the computer system comprising:

at least one processor;

system memory;

a telemetry data analyzing module for analyzing telemetry data concerning a directory of a file system and files under the directory of the file system;

a directory reputation calculating module for computing a reputation score for the directory of the file system based on a reputation of one or more of the files under the directory of the file system, wherein computing the reputation score for the directory includes computing a reputation score for each of a plurality of sub-directories of the directory; and a directory classifying module for classifying the directory of the file system into one of known benign and known malicious based on the computed reputation score for the directory of the file system.

* * * * *